Nov. 5, 1963 — R. J. GITS ETAL — 3,109,659
DEMOUNTABLE SEAL ASSEMBLY
Filed Oct. 17, 1960 — 2 Sheets-Sheet 1
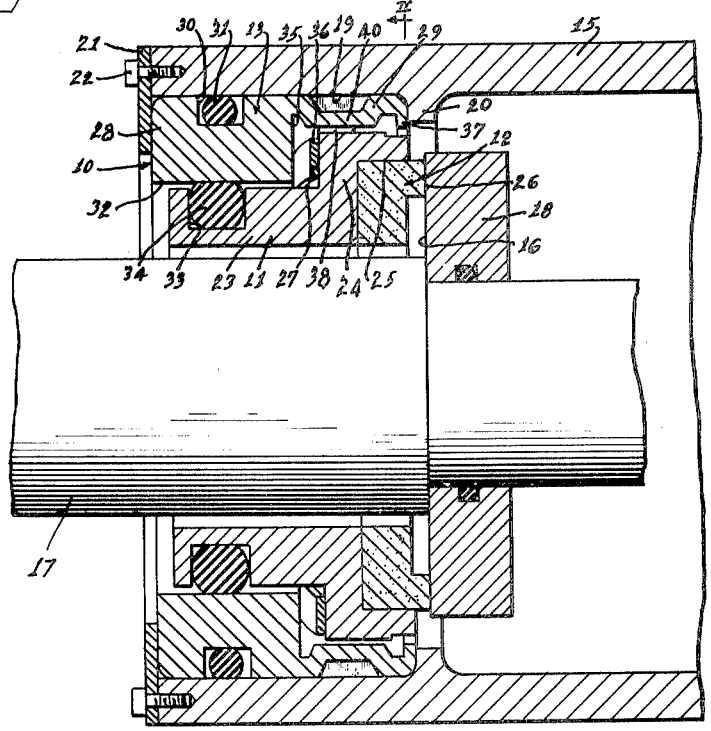
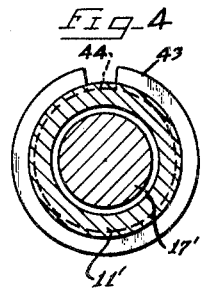
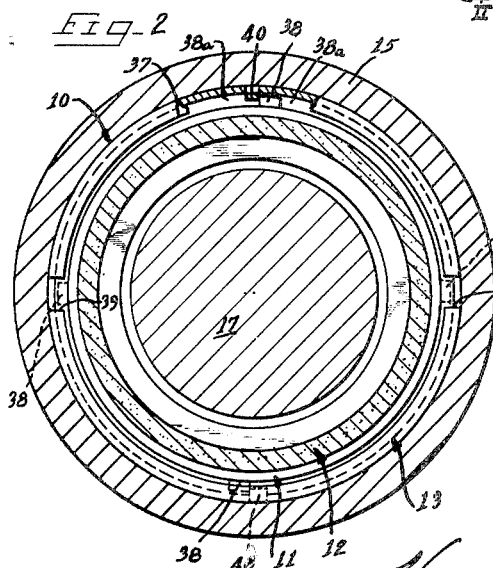
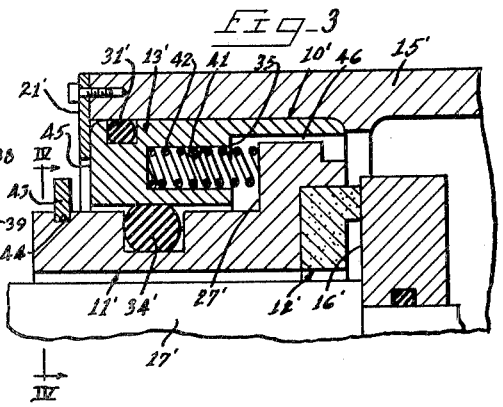
INVENTORS
Remi J. Gits
Dale J. Warner
BY
ATTORNEYS

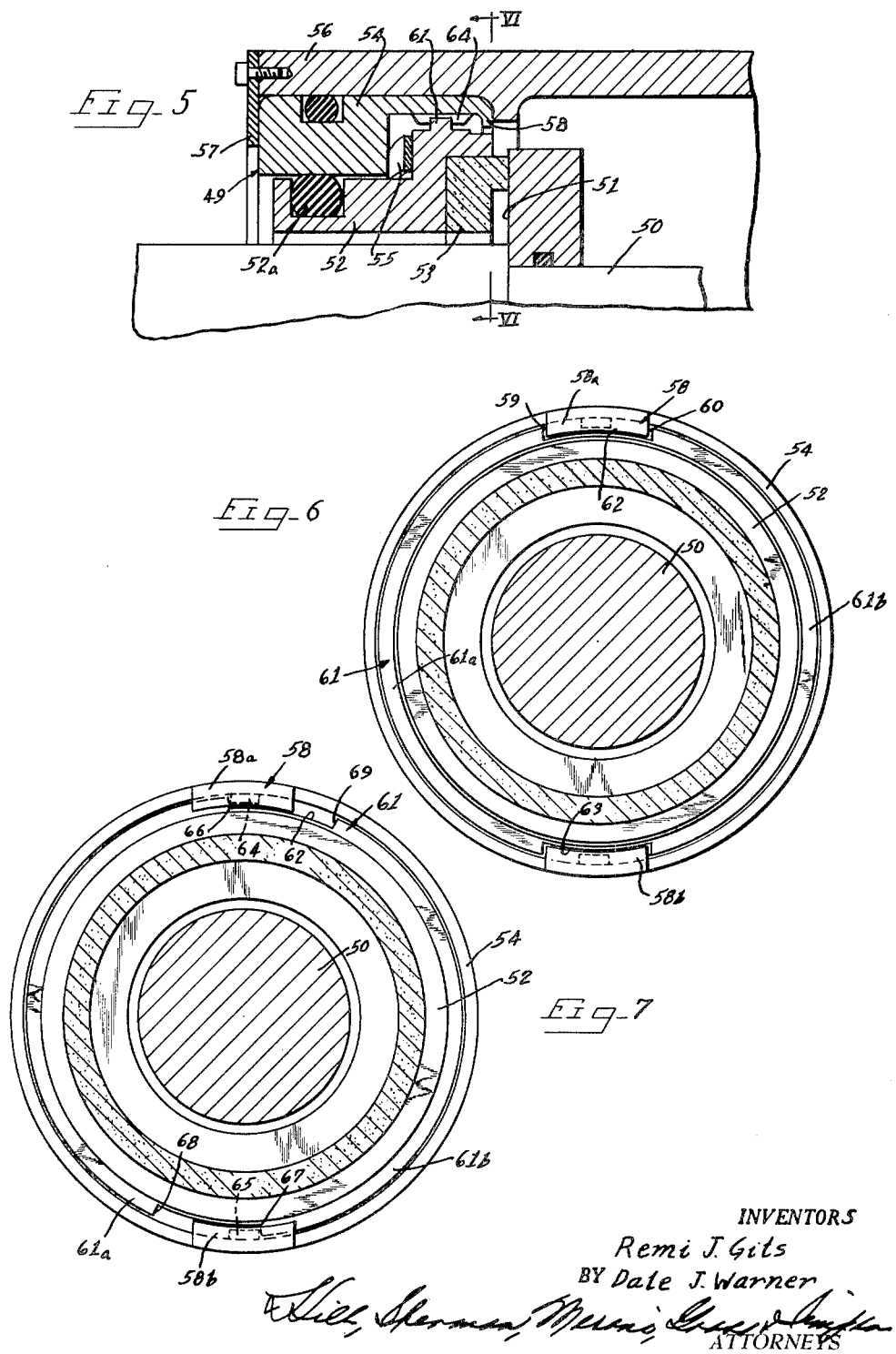

3,109,659
DEMOUNTABLE SEAL ASSEMBLY
Remi J. Gits, Hinsdale, and Dale J. Warner, Chicago,
   Ill., assignors to Gits Bros. Mfg. Co., Chicago, Ill., a
   corporation of Illinois
Filed Oct. 17, 1960, Ser. No. 63,015
10 Claims. (Cl. 277—38)

The present invention relates to improvements in rotary shaft seals and particularly to an improved seal with a releasable lock which holds the seal parts in assembly during operation and permits disassembly for inspection or replacement of parts.

The invention contemplates the provision of a unit sealing assembly which is lightweight and of a small size for replaceable use to be supported in position for sealing engagement with a rotating annular sealing surface on a shaft. The sealing assembly generally will include a carrier ring for supporting a carbon sealing ring. The carrier ring will be surrounded by a casing ring and a spring will be positioned between the carrier and casing rings for urging the carrier and sealing rings toward a sealing position to hold the sealing ring in engagement with a sealing surface. The casing and carrier rings are releasably held in assembly by a rotary lock including an inwardly extending first flange on the casing ring and an outwardly extending second flange on the carrier ring. Each of the flanges is formed with gaps to divide the flanges into flange portions and the portions of the second flange lock behind the portions of the first flange in locked position. The second flange portions engage a rotation preventing stop which prevents relative rotation of the casing and carrier rings during operation. The casing and carrier rings are relatively rotatable to move the second flange portions opposite the gaps of the first flange for disassembly of parts and withdrawal of the carrier ring from the casing ring.

Accordingly it is an object of the present invention to provide an improved rotary seal assembly of the above general nature wherein the parts may be easily disassembled for inspection, cleaning or replacement.

Another object of the invention is to provide improved seal assembly having locking means for the parts wherein the seal assembly is adapted to be made with small profile dimensions and wherein the locking elements can be easily made as portions of the other operating parts.

A further object of the invention is to provide an improved locking seal assembly wherein relative rotation between sealing faces aids in holding the parts of the seal in locked relationship.

A still further object of the invention is to provide a rotary seal assembly with a locking apparatus for holding the parts in assembly wherein the locking apparatus is inexpensively and easily manufactured with the seal parts.

A still further object of the invention is to provide an improved rotary seal having a simplified construction for preventing relative rotation of parts during operation.

Other objects and advantages will become more apparent with the teaching of the principles of the invention in connection with the disclosure of the preferred embodiments in the specification, claims and drawings, in which:

FIGURE 1 is a sectional view taken along the axis of a seal assembly constructed in accordance with the principles of the present invention;

FIGURE 2 is a sectional view taken substantially along line II—II of FIGURE 1;

FIGURE 3 is a fragmentary sectional view showing a modified form of the seal of FIGURE 1;

FIGURE 4 is a sectional view taken substantially along line IV—IV of FIGURE 3;

FIGURE 5 is a fragmentary sectional view taken through the axis of a seal and illustrating another form of locking apparatus;

FIGURE 6 is a vertical sectional view taken substantially along line VI—VI of FIGURE 5 showing the parts of the seal in position for disassembly; and FIGURE 7 is another sectional view taken substantially along line VI—VI of FIGURE 5 and showing the parts in assembled locked normal running position.

As shown on the drawings:

FIGURE 1 shows a seal assembly 10 primarily including a carrier ring 11 for supporting a sealing ring 12 of carbon or suitable similar material bonded to the carrier ring. Surrounding the carrier ring is a casing ring 13. The casing ring is suitably mounted for supporting the seal assembly 10 such as in a housing 15 positioned so that the sealing ring 12 will engage an annular rotating sealing surface 16 on a rotating member 17 such as a shaft. The sealing surface 16 is on an annular member 18 suitably mounted and sealed on the shaft.

It will be understood that the locking mechanism may be employed with seals of various design variations although the preferred seal structure is described. This seal structure provides advantages in use with the locking arrangement provided as will become more clear.

The sealing unit assembly 10 is adapted for use for sealing a rotating member wherein zones must be isolated from each other and these zones may be of different pressures. For example, the seal may be used in an electrical motor wherein explosive gases must be prevented from entering the motor and the motor shaft 17 will project from the housing 15. In many such installations it is important that the seal require as little space as possible for various advantages as will be appreciated by those skilled in the art. A minimum diameter profile dimension is important for reducing the space required and the size required for the supporting housing. A minimum axial profile dimension is important for the same reason and in an installation in a motor as shown, a seal with a long axial length will require a longer shaft. This will space the pulley outwardly and may require the provision of an additional support bearing because of the forces on the long shaft.

The unit seal assembly 10 is conveniently mounted in an inner cylindrical surface 19 in the housing 15 and the casing ring 13 rests against an annular inner rib 20 in the housing, to be held in place by a holding washer 21 removably secured to the housing by screws 22. This permits removal of the seal unit 10 for disassembly of parts.

The carrier ring 11 has a body portion 23 and a head portion 24. The end of the head portion 24 is axially recessed at 25 to provide an annular socket for supporting the sealing ring 12 which is suitably cemented or bonded to the carrier ring. The sealing ring has an annular radial sealing face 26 which engages the sealing face 16. This provides the primary seal. Secondary seals of improved construction are provided between parts to permit relative movement of parts and to provide seals between surfaces.

The head portion 24 of the carrier ring 23 projects radially outwardly to form a shoulder 27 facing rearwardly or away from the sealing ring 12. This construction serves various purposes in providing an arrangement for holding the sealing ring 12, and providing a shoulder 27, and it permits the carrier body to have sufficient depth for the secondary sealing O-ring and the casing ring can have depth, and yet a small diameter profile is obtained.

The casing ring 13 has a body portion 28 which normally surrounds the body portion 23 of the carrier ring and a head portion 29 which surrounds the head portion 24 of the carrier ring. The body portion 28 has an outer annular groove 30 in which is seated a packing ring shown preferably as an O-ring 31 which sealingly engages the inner cylindrical surface 19 of the housing.

A sliding seal is provided between the carrier ring 11 and casing ring 13. The casing ring has an inner cylindrical surface 32 and the carrier ring has an annular outwardly facing groove 33 with a packing ring shown in the preferred form of an O-ring 34 which slidingly sealingly engages the cylindrical sealing surface 32. The arrangement conveniently permits the provision of a simplified compact seal directly between the carrier ring and casing ring which does not interfere with the spring which is provided between the rings. While the packing ring 34 is preferably mounted in the carrier ring, in some circumstances it can be suitably mounted in a groove provided in the surface 32 of the casing ring to sealingly engage the outer surface of the body portion 23 of the carrier ring.

The casing ring 13 has an annular shoulder 35 facing the carrier ring shoulder 27 and an annular wave spring 36 is compressed between the shoulders for urging the sealing ring 12 against the sealing face 16. The construction of the casing and carrier rings is such that various types of springs can be used conveniently, and as will be described in connection with the arrangement of FIGURE 3, the O-ring seal 34 does not interfere with the formation of spring seating wells in the casing ring.

The casing ring and carrier ring are provided with locking apparatus for interlocking the rings together and preventing the carrier ring 11 from being withdrawn from the casing ring 13 when the seal assembly 10 is removed from the housing. The locking apparatus includes an inwardly turned annular outer first flange 37 formed at the end of the head portion 29 of the casing ring, as shown in FIGURES 1 and 2. On the outer surface of the head portion 24 of the carrier ring is an outwardly extending inner second flange 38, shown as provided with gaps 38a to form flange portions which may be referred to as teeth. The outer first flange 37 is also formed with gaps 39 to form flange portions. For assembly, the parts are rotated relatively so that the inner flange portions or teeth 38 are in alignment with the gaps 39 of the outer first flange. Similarly the portions of the outer flange 37 are in alignment with the gaps 38a between the teeth 38. In this position, the rings are pushed axially together and relatively rotated to lock the teeth 38 behind the outer flange 37. Rotation for locking is performed in the direction in which the rotating shaft 17 will turn so that frictional forces against the sealing ring 12 will tend to turn the carrier ring so that the teeth 38 rest against stops 40 which are preferably formed by striking inwardly tongues of metal from the head portion 29. The position of the teeth 38 relative to the gaps 39 for assembling the parts is shown by the dotted line position of FIGURE 2, and the solid line position shows the relationship of parts when the rings are locked. As shown, the carrier ring has been turned counterclockwise so that the teeth 38 move counterclockwise against the stops 40. While two teeth 38 are shown, various other numbers can be used. Also, the number of stops preferably will equal a number of teeth. The frictional forces on the sealing ring tend to hold the teeth against the stops and therefore tend to hold the parts in locked position.

For disassembly, the carrier ring is rotated until the teeth 38 are in position opposite the notches or gaps 39 and the carrier ring can then be withdrawn from the casing ring. The O-ring 34 permits sliding removal. This disassembly permits inspection of parts or cleaning of the assembly or replacement of the carrier ring with a new carbon sealing ring. The carrier ring 11 is preferably formed of aluminum for improved heat transfer away from the sealing ring 12 and for reduced inertia to reduce chattering and to thus increase the operating life of the sealing ring 12. The casing ring is also preferably formed of aluminum.

In the arrangement of FIGURE 3, the basic structural arrangement of FIGURE 1 is employed and similar parts are similarly numbered using a prime affixed to the numeral. This basic structure permits manufacturing different types of seals without changing basic manufacturing operations.

A shaft 17' carries a member with a rotating sealing surface 16' engaged by a sealing ring 12' on a sealing unit assembly 10'.

The unit 10' includes a carrier ring 11' supporting the sealing ring 12' and a surrounding casing ring 13'. The casing ring is mounted within a housing 15' held in place by a washer 21'. An O-ring 31' mounted in the housing ring sealingly engages the housing. An O-ring 34' mounted in the carrier ring 11' slidingly and sealingly engages the inner surface of the casing ring 13'. The carrier ring 11' may be prevented from rotating relative to the casing ring 13' by suitable means, not shown.

The casing ring has a shoulder 35' facing a shoulder 27' on the carrier ring. A plurality of spring wells 41 are drilled axially at circumferentially spaced locations for receiving coil compression springs 42 which engage the shoulder 27' on the carrier ring to urge the sealing ring 12' against the sealing surface 16'. As will be noted, the casing ring 13' accommodates these wells 41 without interference with the seal 34' and without increasing the size of the casing ring 13'.

The assembly of the casing and carrier rings 13' and 11' is held together by a removable stop including a snap ring 43 mounted in an annular groove 44 in the casing ring and positioned at the end of the casing ring opposite the sealing ring 12'. The snap ring will be engaged by the rear end 45 of the casing ring 13', when the spring 42 expands, to hold the unit in assembly and when the snap ring 43 is removed the carrier ring 11' can be removed through the open end 46 of the casing ring for inspection or cleaning of parts or replacement for use of a fresh carbon sealing ring 12'.

The arrangement of FIGURES 3 and 4 employs different springs and a different retainer for the parts. It will be understood that the springs of FIGURES 3 and 4 could be used with the retainer of FIGURES 1 and 2 and the retainer of FIGURES 3 and 4 could be used with the spring of FIGURE 1. Apparatus, not shown, may be added to the arrangement of FIGURES 3 and 4 to prevent the carrier ring from rotating inside of the casing ring. As will be appreciated although the preferred form is shown, the snap ring 43 may be used in different shapes and can be removably mounted on the casing ring to engage an abutment on the carrier ring.

In the arrangement of FIGURES 5 through 7 as compared with FIGURES 1 and 2 the outer locking flanges are shortened and the inner locking flanges are lengthened. A sealing arrangement is provided for a shaft 50 having a rotating member with an annular sealing surface 51. A sealing unit 49 includes a carrier ring 52 supporting a carbon sealing ring 53 in sealing engagement with the surface 51. A casing ring 54 surrounds the carrier ring 52 and a sliding seal 52a is located between the casing and carrier rings. The casing ring is supported in a housing 56 and held in place by a washer 57.

At the head end of the casing ring 54 is an inturned outer first flange 58. Gaps 59 and 60 are formed in the first flange to form flange portions 58a and 58b.

On the carrier ring 52 is an outwardly extending inner second flange 61. This flange is provided with gaps 62 and 63 to form flange portions 61a and 61b. The gaps 62 in the inner second flange are of sufficient width to pass the outer flange portions 58a and 58b. Similarly the gaps 59 and 60 are of sufficient width to pass the inner flange portions 61a and 61b.

As shown in FIGURE 6, wherein the casing ring 54 and carrier ring 52 are shown in position for assembly or disassembly, the outer flange portions 58a and 58b are in rotational alignment with the gaps 62 and 63 in the inner flange.

If it is assumed that the casing ring 54 and carrier ring 52 are being assembled, the parts are rotationally positioned as shown in FIGURE 6, and the parts are pushed axially together compressing a spring 55 between the parts. When the inner flange 61 is axially inside the outer flange 58, the rings 52 and 54 are rotated relatively. The direction of rotation will be determined by the direction that the shaft 50 is expected to rotate. As shown in FIGURE 7, a clockwise rotation of the shaft 50 is expected, and the carrier ring 52 is rotated in a clockwise direction. This brings end surfaces 66 and 67 of the inner flange portions 61a and 61b against rotation-preventing stops 64 and 65. These stops prevent the carrier ring 52 from being rotated within the casing ring 54 while the shaft is turning.

If rotation of the shaft 50 were expected in the opposite direction, the carrier ring would be turned so that the end surfaces 68 and 69 would be against the stops 65 and 64 respectively.

As a brief summary of operation, with reference to FIGURES 1 and 2, the sealing unit assembly 10 is supported within the housing 15 for holding the sealing ring 12 in engagement with an annular sealing surface 16 on the shaft 17 to provide a primary seal. An O-ring 34 provides a sliding secondary seal between the casing ring 13 and the carrier ring 11. When the unit 10 is removed from the housing, the carrier ring 11 is held in assembly within the casing ring by the inner flange portions or teeth 38 striking the outer flange portions 37. For disassembly, the carrier ring 11 is rotated relative to the casing ring 13 to align the teeth 38 with the notches or gaps 39 between the flange portions 37. The carrier ring 11 can then be slid out for inspection, cleaning or replacement of another carrier ring with a fresh sealing ring 12. Reassembly is permitted by forcing the carrier ring 11 against the spring 36 to push the teeth 38 through the notches 39 and the carrier ring is then rotated until the teeth engage the rotation-preventing stops 40.

Thus it will be seen that we have provided an improved sealing ring assembly which meets the objectives and advantages above set forth. The parts are constructed for rapid disassembly and are held without chance of accidental disassembly during operation. The locking arrangements provided are not complicated in construction and are easy to handle.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A sealing unit for providing a seal for a rotating member comprising a carrier ring having a sealing member mounted thereon for sealing engagement with a rotating sealing face on a rotating member, a casing ring surrounding the carrier ring, a spring between the casing ring and carrier ring for urging the carrier ring and sealing member toward a sealing position, an inwardly extending first flange on said casing ring, said first flange formed with gaps separating flange portions, and an outwardly extending second flange on the carrier ring, said second flange formed with gaps therebetween separating flange portions, said second flange portions locked behind said first flange portions in a locked position of said rings, said casing and carrier rings relatively rotatable to align said flange portions of one ring with said gaps of the other ring for separating the rings.

2. A sealing ring unit for providing a seal for a rotating member comprising in combination a carrier ring having a sealing member mounted thereon for sealing engagement with a rotating sealing face on a rotating member, a casing ring surrounding the carrier ring, a spring between the casing ring and the carrier ring for urging the carrier ring and sealing member toward a sealing position, a flange on one of said rings projecting toward the other ring, and a lock member on the other of said rings projecting behind the flange in locked position so that said casing and carrier rings can be relatively rotated for moving the lock member from behind the flange to unlocked position to separate the carrier ring from the casing ring.

3. A sealing unit for providing a seal for a rotating member comprising in combination a carrier ring having a sealing ring mounted thereon for sealing engagement with a rotating sealing face on a rotating member, a casing ring, a spring between the casing ring and carrier ring for urging the carrier ring and sealing ring toward a sealing position, and a releasable lock connected between said carrier ring and said casing ring to limit relative axial movement caused by the spring and releasing the rings for disassembly, said lock being releasable by rotation of said carrier ring relative to said casing ring.

4. A sealing unit for providing a seal for a rotating member comprising in combination a carrier ring having a sealing member mounted thereon for sealing engagement with a rotating sealing face on a rotating member, a casing ring, a spring between the casing ring and carrier ring for urging the carrier ring and sealing member toward a sealing position, and a stop member connected to one of said rings projecting therefrom in a locking position to engage the other ring to limit the relative movement caused by said spring and displaceable to an unlocking position by rotation of the carrier ring relative to the casing ring permitting removal of the carrier ring from the casing ring.

5. A unitary seal assembly to be supported for sealing engagement with an annular sealing face on a rotating member comprising a carrier ring having a body portion and a head portion with a sealing ring mounted on the head portion for engagement with a rotating sealing surface, said head portion projecting radially outwardly from the body portion and having a radial shoulder facing away from the sealing ring, a casing ring having a body portion surrounding the body portion of said carrier ring and having a head portion surrounding the head portion of the carrier ring, sliding sealing means between said body portions, a spring between said shoulder and the body portion of the casing ring for urging the sealing ring into sealing engagement with the surface engaged thereby, a flange on one of said head portions projecting toward the other head portion, a tooth on the other of said head portions projecting toward the flange, and an opening in said flange for receiving said tooth so that said casing and carrier rings can be relatively rotated to lock the tooth behind said flange for normal operation of the seal or to align the tooth with said opening for disassembly of the seal.

6. A unitary seal assembly to be supported for sealing engagement with an annular sealing face on a rotating member comprising a carrier ring having a body portion and a head portion with a sealing ring mounted on the head portion for engagement with a rotating sealing surface, said head portion projecting radially outwardly from the body portion and having a radial shoulder facing away from the sealing ring, a casing ring having a body portion surrounding the body portion of said carrier ring and having a head portion surrounding the head portion of the carrier ring, sliding sealing means between said body portions, a spring between said shoulder and the body portion of the casing ring for urging the sealing ring into sealing engagement with the surface engaged thereby, an inwardly extending annular flange on said head portion of the casing ring, an outwardly extending tooth on the head portion of the carrier ring, and means defining a recess in the flange for receiving said tooth so that the tooth may be interlocked behind the flange for assembly and disassembly of the rings.

7. A unitary seal assembly to be supported for sealing engagement with an annular sealing face on a rotating member comprising a carrier ring having a body portion and a head portion with a sealing ring mounted on the head portion for engagement with a rotating sealing surface, said head portion projecting radially outwardly from the body portion and having a radial shoulder facing away from the sealing ring, a casing ring having a body portion surrounding the body portion of said carrier ring and having a head portion surrounding the head portion of the carrier ring, sliding sealing means between said body portions, a spring between said shoulder and the body portion of the casing ring for urging the the sealing ring into sealing engagement with the surface engaged thereby, an inwardly extending annular flange on said head portion of the casing ring, an outwardly extending tooth on the head portion of the carrier ring, means defining a recess in the flange for receiving said tooth so that the tooth may be interlocked behind the flange for assembly and disassembly of the rings, and stop means inside of said flange spaced from the opening therein for engagement by the tooth to prevent relative rotation between said casing and carrier rings.

8. A seal assembly for providing a seal for a rotating member comprising a carrier ring having a sealing member mounted thereon for sealing engagement with a rotating member, a casing ring, a spring between the casing ring and carrier ring for urging the carrier ring and sealing member toward a sealing position, a sliding seal between the carrier ring and casing ring, and locking members connected to said rings and movable to locked position with relative rotation between the rings in one direction and movable to unlocked position with relative rotation between the rings in the opposite direction.

9. A seal assembly for a rotating member comprising a carrier ring with a sealing member mounted thereon for sealing engagement with a rotating sealing face, a casing ring surrounding the carrier ring, a spring between the casing ring and carrier ring for urging the carrier ring and sealing member toward a sealing position, a flange on one of said rings projecting toward the other ring, a lock member on the other of said rings projecting behind the flange in locked position, and a stop on said one ring engageable by said lock member in locked position to prevent relative rotation between said rings in one direction, said rings relatively rotatable in the opposite direction to move the lock member from behind the flange to unlocked position to separate the carrier ring from the casing ring.

10. A sealing unit for providing a seal for a rotating member comprising in combination a carrier ring having a sealing member mounted thereon for sealing engagement with a rotating sealing face on a rotating member, a casing ring, a spring between the casing ring and carrier ring for urging the carrier ring and sealing member toward a sealing position, a stop member connected to one of said rings projecting therefrom in a locking position to engage the other ring to limit the relative movement caused by said spring, and an axial opening in said other ring passing said stop in a predetermined relative rotational release position of said rings permitting removal of the carrier ring from the casing ring.

References Cited in the file of this patent

UNITED STATES PATENTS

| | | |
|---|---|---|
| 2,479,236 | Hanson | Aug. 16, 1949 |
| 2,682,422 | McBride | June 29, 1954 |
| 2,984,507 | Welch | May 16, 1961 |